(12) United States Patent
Taylor

(10) Patent No.: US 6,173,652 B1
(45) Date of Patent: Jan. 16, 2001

(54) ENVIRONMENTALLY SEALED SHOT

(75) Inventor: David Bradley Taylor, Fife (GB)

(73) Assignee: Bradley Taylor Holding Company Limited, Edinburgh (GB)

( * ) Notice: Under 35 U.S.C. 154(b), the term of this patent shall be extended for 0 days.

(21) Appl. No.: 09/101,086

(22) PCT Filed: Jan. 10, 1997

(86) PCT No.: PCT/GB97/00080

§ 371 Date: Jun. 30, 1998

§ 102(e) Date: Jun. 30, 1998

(87) PCT Pub. No.: WO97/25587

PCT Pub. Date: Jul. 17, 1997

(30) Foreign Application Priority Data

Jul. 10, 1996 (GB) .................................................. 9614468

(51) Int. Cl.⁷ ........................................................ F42B 7/04
(52) U.S. Cl. ........................ 102/459; 102/448; 102/514; 102/515; 102/516
(58) Field of Search .................... 102/448, 459, 102/514–516

(56) References Cited

U.S. PATENT DOCUMENTS

| | | | |
|---|---|---|---|
| 1,865,727 | * 7/1932 | Schuricht | 102/459 |
| 2,772,634 | * 2/1956 | Oberfell | 102/459 |
| 2,919,647 | * 1/1960 | Dear et al. | 102/459 |
| 3,267,035 | * 8/1966 | Tillman | 102/459 |
| 3,363,561 | * 1/1968 | Irons . | |
| 4,080,899 | * 3/1978 | Luban | 102/42 |
| 4,714,023 | * 12/1987 | Brown | 102/516 |
| 4,731,189 | 3/1988 | Gregg, Jr. . | |
| 5,088,415 | 2/1992 | Huffman et al. . | |
| 5,189,252 | * 2/1993 | Huffman et al. | 102/459 |
| 5,368,866 | 11/1994 | Loucas . | |
| 5,528,988 | * 6/1996 | Lindgren et al. | 102/459 |

FOREIGN PATENT DOCUMENTS

| | | |
|---|---|---|
| 2079418 | 1/1982 | (GB) . |
| 2141360 | 12/1984 | (GB) . |
| 53142098 | 12/1978 | (JP) . |
| 53-142098 | 12/1978 | (JP) . |

* cited by examiner

Primary Examiner—Michael J. Carone
Assistant Examiner—Daniel J. Beitey
(74) Attorney, Agent, or Firm—Dann, Dorfman, Herrell & Skillman; Henry H. Skillman

(57) ABSTRACT

Shot having a lead or lead alloy core is sealed from the outside by at least one non-toxic layer which protects the environment from lead waste toxicity and which includes an abhorrent material to act as a repellant for preventing or deterring birds from ingesting or swallowing the shot.

13 Claims, 1 Drawing Sheet

ENVIRONMENTALLY SEALED SHOT

BACKGROUND OF THE INVENTION

This invention relates to shot for use in shotguns. In particular, the invention relates to shot having a metallic core made of lead or lead alloy.

Spent lead shot lying on the ground can be a problem to birds. Such spent shot is often picked up or "mouthed" with gravel by the birds and may also be swallowed and taken into the gizzard of the bird. The lead from the shot is broken down and absorbed by the bird often in lethal doses.

Spent lead shot lying on open ground can also be an environmental problem with the lead leaching and causing toxic poisoning of the ground or of water sources or being digested by birds.

Attempts have been made in the past to alleviate this problem by coating the individual shot pellets with a barrier layer to prevent the toxic lead from being absorbed into the ground or into birds digesting the shot pellets. However existing coating techniques have not proved to be completely successful since known coatings can be worn or ground away by the abrasive action of a bird's gizzard.

Known coating techniques generally involve coating lead or lead alloy shot with at least one layer of wear-resistant non-toxic coating material acting as a shield or barrier to the toxic lead or lead alloy core. The known coating materials suitably comprises a solid film lubricant, e.g. polytetrafluoroethylene or molybdenum disulphide. Solid film lubricant is the preferred known coating material since it is both non-toxic and inert and thus reduces the harm to the environment caused by spent shot. Ideally each pellet is coated with a coherent or continuous coating of the coating material. Different coating materials may be applied in different coating operations, e.g. by a dip, barrel or spray process. To assist adhesion of such coatings, adhesive resins may be employed. The coating applied to each pellet may not be thick, e.g. from 0.01 to 0.02 mm.

Although known coatings applied to shot are not intended to damage the environment, they do not discourage birds and the like from actually digesting the shot when the shot has been used and is lying on the ground. If so digested the coating can become removed, resulting in the lead being absorbed into the bird.

SUMMARY OF THE INVENTION

The present invention seeks to provide shot with a non-toxic coating which firstly acts as a shield or barrier around the lead or lead alloy core of the shot to completely seal the core from the outside thereby safeguarding the environment from the toxic shot core and secondly prevents birds from attempting to swallow, digest or ingest or even to pick up spent shot pellets lying on the ground. More particularly the sealed shot includes a non-toxic substance or substances which acts as an abhorrent or repellant either to deter birds from attempting to eat the shot pellets in the first place or, if the shot pellets are initially taken into the mouth of the bird, to cause, by the nature of the substance or substances, the bird immediately to reject and spit out the coated shot. Such substances are referred to in this specification as "abhorrent materials". It is also a preferred aim to provide a sealed shot in which any applied sealing or coating layer does not adversely affect the shooting capabilities of the shot.

DETAILED DESCRIPTION OF THE PREFERRED EMBODIMENTS

Figure 2:
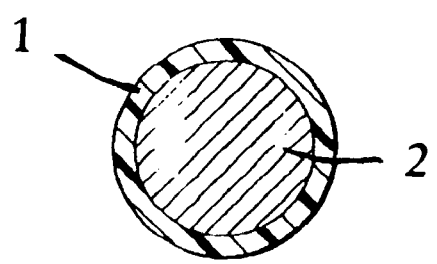
FIG. 2 is a side sectional view of the coated shot according to another embodiment of the invention.

With reference to FIG. 2 accordingly the present invention, in its broadest aspect, relates to shot having a lead or lead alloy core (2) and at least one non-toxic layer (1) round the core which seals the core from the outside and which includes an abhorrent material or materials.

The non-toxic layer(s) is intended to prevent toxic core material form coming into contact with the surrounding environment whilst deterring animal wildlife, in particular birds, from attempting to swallow or digest spent shot.

Conveniently the shot core is completely surrounded or encapsulated by a barrier layer comprising a mixture of at least one abhorrent material and another coating material, e.g. an inert, non-toxic material of the type referred to above, for providing the shot with a seal. It is possible, however, to have, for example, a separate sealing or barrier or shielding layer completely surrounding the metallic core and abhorrent material applied separately on top of the barrier layer. In this case the abhorrent material need not be applied in a continuous covering. The surrounding layer should be resistant to environmental degradation and, in particular, should not wear away significantly over a period of time. It is also preferred that any covering layer applied to the shot core should be resiliently deformable so as to adopt the shape of the lead or lead alloy core if the latter is deformed in use, e.g. after the shot strikes a target.

Examples of abhorrent materials which may be included in one or more layers applied to the metallic core material are natural or synthetic flavourings or other materials including spices, oils and chemicals. A particularly effective abhorrent material is chilli or chilli pepper. Other specific examples are clove oil and soap. Such abhorrent materials have a taste or flavour which is repellant to any bird attempting to pick up, swallow or digest the shot pellets. Generally such taste-repellant abhorrent materials will have a bitter taste. Other examples of taste-repellant abhorrent materials are solutions applied to human nails to deter nail biting. Such a solution may dry to provide an effective barrier layer by itself. Alternatively the solution may be mixed with other coating materials. Alternatively and/or additionally, the abhorrent material may have a repellant smell or odour. All these abhorrent materials are, of course, non-toxic and merely act as repellants to positively prevent or deter birds swallowing shot Preferably the layer or layers applied to the shot core will not significantly degrade in the environment after use. In particular the layer or layers should not wear away when lying on the ground or dissolve when in water.

The coating layer or layers may be applied by any suitable known coating technique, such as by spraying, tumbling, immersion (including dip-drain and dip-spin), curtain coating, electrophoresis, autophoresis, roller coating and printing. The coating layer or layers may be air dried, oven cured, electron beam cured, IV cured, UV cured or cured in any other suitable manner.

An embodiment of the invention will now be described, by way of example only, with particular reference to the following non-limitative example.

EXAMPLE

Conventional lead shot was cleaned of surface lubricants and oxides by agitating the shot in an aqueous slurry of cleaning material, e.g. kitchen cleaning powder, for about 10 minutes, washing the cleansed shot with water and finally drying the shot. The cleansed shot was then agitated in or sprayed with, an aqueous slurry of finely divided polytetrafluoroethylene (or any other suitable inert material) and dried by heating in an oven at a temperature of about 250° C. to fuse the powdered polytetrafluoroethylene particles into a continuous coating sealing the lead core of the shot from the outside. The shot was then cooled to room temperature. This sealing coating is resilient so that it is able to deform, without cracking or becoming removed from the underlying lead core, in use of the shot and in particular if the lead core is deformed by the shot striking a target. The sealed shot core was then sprayed or dipped with a concentrated solution of chilli pepper and the coated shot was allowed to dry naturally, the sealing coating acting as a base to receive the abhorrent chilli pepper material. In the sealed and coated shot, the core was found to be completely sealed from the surrounding atmosphere. The shot was loaded into a shotgun cartridge in a known manner. After firing the cartridge from a shotgun, it was found that the incorporation of the chilli pepper on the sealant coating of the spent shot acted as a positive repellent to birds deterring them from digesting the treated shot.

Figure 1:
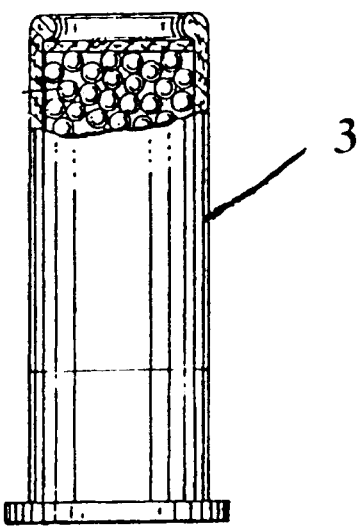
FIG. 1 is a side and partial sectional view of a shotgun cartridge according to an embodiment of the invention.

With reference to FIG. 1, shot in accordance with the invention can be made by treating conventional lead or lead alloy shot, which is the preferred type of shot for use in shotgun cartridges (3) used for whatever purpose. Such treated shot can be used safely without the toxic lead core from the spent shot coming into contact with the ground and the environment and without the shot being digested by birds.

The encapsulation of the lead core of the shot conveniently provides the shot with a slippery coating which allows the spent shot lying on the ground to sink into the ground at a faster rate than untreated shot. Such spent shot is thus lost to surface activity more speedily than untreated shot. Furthermore, if a bird is wounded, e.g. in the gut area, by encapsulated shot, the encapsulating layer will allow the wound to heal without the shot causing lead poisoning of the bird.

Shot in accordance with the invention is comparatively humane in use and is safe to the environment and the user. Birds are positively discouraged from attempting to eat spent shot lying on the ground by the inclusion of the abhorrent/repellant material.

What is claimed is:

1. A shot having a core comprising lead and a non-toxic layer encapsulating the core which seals the core from the outside, characterized in that said non-toxic layer incorporates at least one abhorrent material acting as a repellant for deterring ingestion of the shot, said layer being resistant to environmental degradation and not subject to wearing away over a period of time.

2. A shot according to claim 1 wherein said at least one abhorrent material comprises chili.

3. A shot according to claim 1 wherein said encapsulating layer comprises a resilient material.

4. A shot according to claim 1 wherein said non-toxic layer comprises a mixture of said abhorrent material and an inert non-toxic material.

5. A shot according to claim 1, wherein said non-toxic layer comprises a barrier layer and said abhorrent material applied as a separate coating on the barrier layer.

6. A shot according to claim 1, wherein said non-toxic layer comprises materials which do not dissolve when in water.

7. A shotgun cartridge having a load consisting of a plurality of shot according to claim 1.

8. A shotgun cartridge according to claim 7 wherein said at least one abhorrent material comprises chili.

9. A shotgun cartridge according to claim 7 wherein said encapsulating layer comprises a resilient material.

10. A shotgun cartridge according to claim 7, wherein said non-toxic layer comprises a mixture of said abhorrent material and an inert non-toxic material.

11. A shotgun cartridge according to claim 7, wherein said non-toxic layer comprises a barrier layer and said abhorrent material applied as a separate coating on the barrier layer.

12. A shotgun cartridge according to claim 7, wherein said at least one non-toxic layer comprises materials which do not dissolve when in water.

13. A shotgun cartridge comprising a plurality of shots, each of said plurality of shots having a core comprising lead and a non-toxic layer encapsulating the core which seals the core from the outside environment, said non-toxic layer comprising a resilient material incorporating at least one abhorrent material acting as a repellant for deterring ingestion of the shot, said layer being resistant to environmental degradation, not subject to wearing away over a period of time, and comprising materials which do not dissolve in water.

* * * * *